United States Patent [19]

Rupprecht et al.

[11] Patent Number: 6,097,338
[45] Date of Patent: Aug. 1, 2000

[54] INSTRUMENT LANDING SYSTEM GLIDE PATH TRANSMITTER DEVICE

[75] Inventors: Rainer Rupprecht, Heidelberg; Jürgen Stammelbach, Stuttgart; Herbert Kleiber, Ludwigsburg, all of Germany

[73] Assignee: Airsys Navigation System GmbH, Stuttgart, Germany

[21] Appl. No.: 09/147,609

[22] PCT Filed: May 22, 1998

[86] PCT No.: PCT/EP98/03661

§ 371 Date: Mar. 24, 1999

§ 102(e) Date: Mar. 24, 1999

[87] PCT Pub. No.: WO98/54546

PCT Pub. Date: Dec. 3, 1998

[30] Foreign Application Priority Data

May 31, 1997 [DE] Germany ............................ 197 22 913

[51] Int. Cl.[7] ............................... G01S 1/16; G01S 1/18; G01S 1/30
[52] U.S. Cl. ............................................ 342/412; 342/394
[58] Field of Search ................................... 342/412, 410, 342/394

[56] References Cited

U.S. PATENT DOCUMENTS

| | | | |
|---|---|---|---|
| 3,793,597 | 2/1974 | Toman | 342/412 |
| 3,866,228 | 2/1975 | Alford | 342/412 |
| 3,938,155 | 2/1976 | Mears et al. | 342/410 |
| 4,025,760 | 5/1977 | Trenkamp | 340/825.34 |
| 4,387,375 | 6/1983 | Kleiber et al. . | |
| 4,506,332 | 3/1985 | Bloch et al. . | |
| 4,940,984 | 7/1990 | Kleiber . | |
| 5,097,266 | 3/1992 | Grosseau | 342/410 |
| 5,130,716 | 7/1992 | Kleiber . | |
| 5,248,983 | 9/1993 | Kleiber et al. . | |

Primary Examiner—Thomas H. Tarcza
Assistant Examiner—Fred H Mull
Attorney, Agent, or Firm—Oblon, Spivak, McClelland, Maier & Neustadt, P.C.

[57] ABSTRACT

A glide path transmitter for an instrument landing system. The transmitter includes several antenna radiators by way of which high frequency signals containing various low frequency modulated carrier and side band components are radiated. The components overlap each other in the far field where they form a guide signal which can be evaluated by aircraft. Phases of the carrier oscillations of the radiated high frequency signals form the guide signal having a set relationship with each other. A separate digitally controlled modulator is provided for each high frequency signal fed to an antenna radiator. The modulator modulates the phase and amplitude of a high frequency oscillation fed thereto according to a given model and inputs the modulated high frequency signal into the antenna radiator allocated thereto, thus reducing the supply network expenditure.

20 Claims, 2 Drawing Sheets

INSTRUMENT LANDING SYSTEM GLIDE PATH TRANSMITTER DEVICE

BACKGROUND OF THE INVENTION

1. Field of the Invention

The invention relates to a glide path transmitter device for the instrument landing system (ILS) with a plurality of antenna radiators by way of which low-frequency modulated high-frequency signals, containing various carrier and side-band components, are emitted, which are superimposed in the Fraunhofer region, where they form a guide signal that can be analysed by aircraft, the phases of the carrier oscillations of the high-frequency signals to be emitted, which form the guide signal, being in fixed relation to one another.

2. Discussion of the Invention

In known systems of this type, especially in a so-called ILS M-type array and B-type array, carrier signals (CSB) and side-band signals (SBO) are emitted by way of antennae A1, A2 and A3 or A1 and A2 in the B-type array arranged at different heights above the ground. The signals are superimposed on one another in the Fraunhofer region where they form guide signals corresponding to the ILS standard, which can be analysed by aircraft. As is well-known, each antenna does not receive just one single signal component, rather a plurality of superimposed signal components has to be fed to some antennae. This is done by generating the required high-frequency signal in a feed network, that is a so-called load distributor, by adding the pure carrier signals (CSB) and side-band signals (SBO) already boosted to the required output power. Phase adjustments, which are necessary for the most precise setting possible of the glide path of the ILS system, especially when setting up the system for the first time, require phase shifters, that must be manually adjusted, arranged in proximity to the antennae. The load distributor is costly and prone to faults.

SUMMARY OF THE INVENTION

The object of the invention is to identify a simpler transmitter device. This object is achieved according to the characterising part of claim 1, in that for each of the high-frequency signals fed to an antenna radiator a separate digitally controlled modulator is provided, which modulates the phase and amplitude of a high-frequency oscillation fed to it according to a pre-determined pattern and feeds the modulated high-frequency signal into the antenna radiator assigned thereto.

In the invention, therefore, the high frequency to be emitted is not generated by a load distributor, rather signals are generated in the modulation that can each be fed directly to a single antenna without a load distributor, that is without complicated and costly superimposition in proximity to the antenna. Only when generating the clearance signal, as is also usual in known systems, is this generally to be fed to two of the three antennae, for which purpose simple power couplers, especially 3dB couplers, can be used. Another advantage is that by influencing the modulators the phase of the signals fed to the antennae can be modified so that manually operated phase shifters can be dispensed with. Influencing the modulators is possible by purely electrical means, thereby also facilitating a remote control and automatic feedback control.

When surveying the glide path with the aid of an aircraft, the invention advantageously allows the necessary adjustment to be performed very rapidly as a function of the survey result and the system requirements, so that the time needed for the survey aircraft and hence the costs of the survey, and the time needed for setting up the system can be reduced, because the necessary adjustments can be performed more quickly due to the absence of manually adjusted phase shifters.

In one embodiment of the invention a modulation signal generator is proposed for generating the pattern fed to the respective modulator, and the modulation signal generator is designed in such a way that it generates the pattern on the basis of at least one wave form digitally stored in a memory. One advantage of this is that digital storage permits fast, accurate calculation of the pattern and facilitates modification.

In one embodiment of the invention it is proposed that a further memory be assigned to the modulation signal generator, in which memory at least one pattern is stored after it has been generated from at least one digitally stored wave form, and from which it is read out for feeding to the assigned modulator. One advantage of this is that the corrected adjustment values can be used for a longer period of time without constantly recalculating.

In one embodiment of the invention it is proposed that it also be designed to generate a clearance signal, and that coupling devices be provided in order to couple the clearance signal to the required antennae. One advantage of this is that the clearance signal can be processed by the device according to the invention.

In one embodiment of the invention it is proposed that it also be designed to generate a clearance signal and that the clearance signal also be generated by a modulator, which is set to a pre-determined pattern. One advantage of this is that the principle of the invention is also applicable to the generation of the clearance signal.

In one embodiment of the invention it is proposed that measuring signals which, with regard to amplitude and phase, are characteristic of the high frequency signals emitted, be fed to a feedback control device where they are compared with set-point values, and that when a deviation from the set-point values exceeds a certain threshold, a feedback control be performed in such a way that at least one of the patterns is modified until the value no longer lies below the threshold [sic]. One advantage of this is that a simple correction of the emitted antenna signals is possible.

In one embodiment of the invention a remote control device is proposed that permits connection to remote control units in such a way that the system can be adjusted and controlled remotely by the remote control units. This is advantageous for servicing and operation.

Further features and advantages of the invention will be apparent from the following description of examples of embodiments of the invention with reference to the drawing, which shows details essential to the invention, and from the claims. The individual details may be realised in an embodiment of the invention either severally or jointly in any combination.

DETAILED DESCRIPTION OF THE PREFERRED EMBODIMENTS

The invention will be explained with reference to a transmitter device for generating the signals for three antennae A1, A2 and A3.

The arrangement of these antennae, known in the art, and the high frequency signals that they emit for generation of the guide signals will first be briefly explained. Antenna A1 is closest to the ground, antenna A3 has the greatest height above the ground. The ground, due to its electrical conductivity, produces a reflection of the signals emitted, thereby contributing to the formation of the vertical directional diagram. The antennae A1 and A2 are fed with signals CSB-1 and CSB-2 of the so-called carrier signal (which is itself amplitude-modulated), the usual modulation frequencies and percentage modulations being 90 Hz with 46%, 150 Hz with 34% for CSB-1 and 90 Hz with 64% 150 Hz with 16% for CSB-2. These numerical values are, however, not mandatory for the principle of the invention. Antenna A3 emits the SBO (<<Side Band Only) signal without the carrier. By superimposing the carrier signal and the side band signal in the Fraunhofer region, an amplitude-modulated signal, analysable by aircraft, is produced, the difference of which from the percentage modulation varies as a function of the prescribed glide path. Depending on whether the aircraft is flying too high or too low, it receives the modulation with more than 90 Hz or more than 150 Hz signal component, which conveys to the pilot the instruction <<fly lower>> or <<fly higher>>. The emission of a so-called clearance signal is also known, this being fed into the antennae A1 and A3. The antennae signals emitted have no symmetry in the altitude direction.

The presence of the clearance signal is of no importance for the principle of the invention, but the clearance signal may also be generated and fed to the corresponding antenna with a system according to the invention, as described below.

Figure 1:
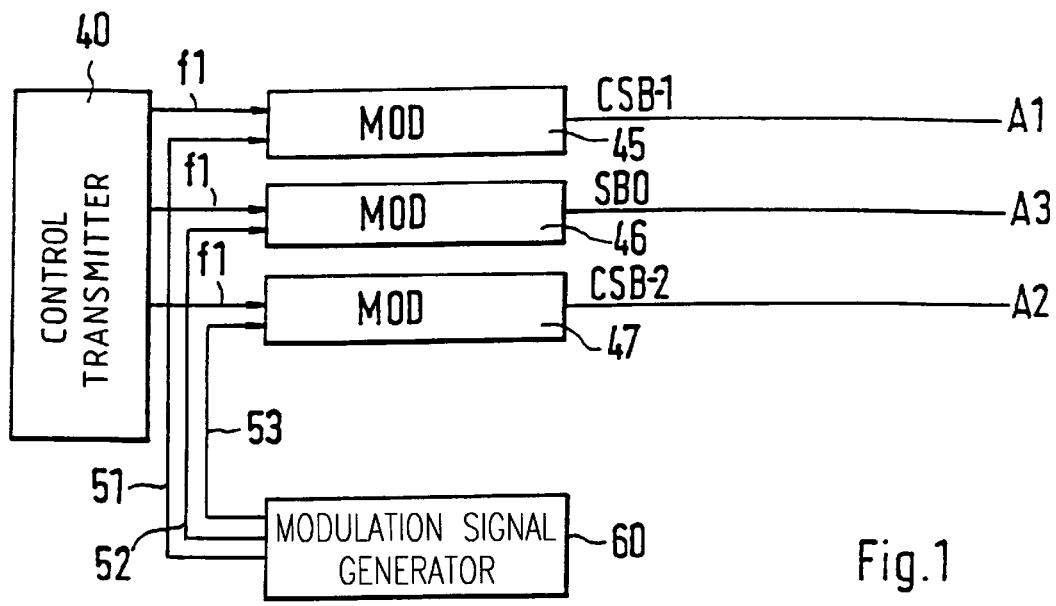
FIG. 1 shows a general block circuit diagram of a first embodiment of a glide path transmitter device with generation of the guide signal.

A transmitter device shown in FIG. 1 contains a control transmitter 40, which generates a high-frequency oscillation f1 (hereinafter referred to as guide carrier oscillation), which in the embodiment has a frequency in the range from approximately 328 to approximately 335 Hz. The guide carrier oscillation f1 is fed via separate outputs to each modulator 45, 46 and 47 for the generation of the guide signal. Modulation inputs 45–47 are connected by way of modulation lines 51–53 to outputs of a modulation signal generator 60.

The modulation signal generator 60 generates modulation signals such that modulated signals, which can be fed directly to the antennae A1, A3, and A2, appear on the outputs of the modulators 45, 46 and 47.

In the case of transmitter devices of the type described here it is particularly important that a constant phase difference is set and maintained between the output signals of the different modulators. A device of this type is known from German published specification DE-A1-3029169 and is also proposed in the embodiment of the invention. For this purpose a phase meter is proposed which contains a sampling switch (achieved by means of semiconductor elements), to which the output signals from different modulators are fed one after another, these being compared with the reference carrier (=guide carrier oscillation f1), which is supplied by the control transmitter 40. In so doing, unwanted phase shifts can be detected in the manner described in more detail in DE-A1-3029169. A controllable phase shifter is connected to each individual modulator on the input side in the high frequency path. By feeding phase control signals to the individual, controllable phase shifters, unwanted phase shifts can be corrected. Deviations in the amplitude of the individual signals can also be detected and corrected by correction signals.

Figure 2:
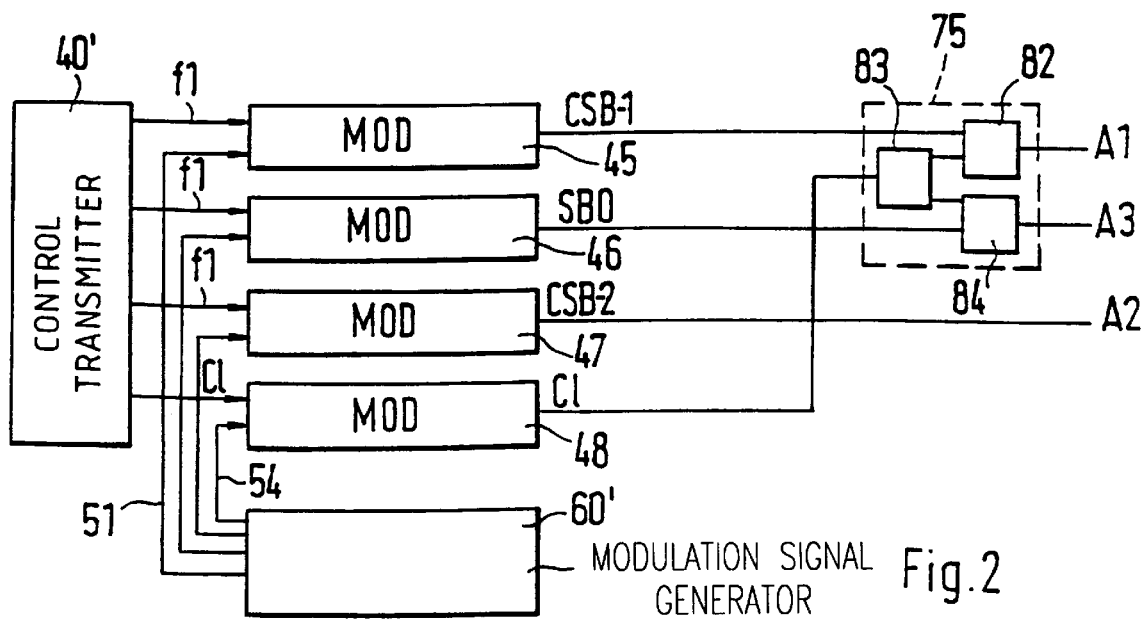
FIG. 2 shows a representation of a second embodiment corresponding to FIG. 1, for a transmitter device with additional generation of a clearance signal.
Figure 3:
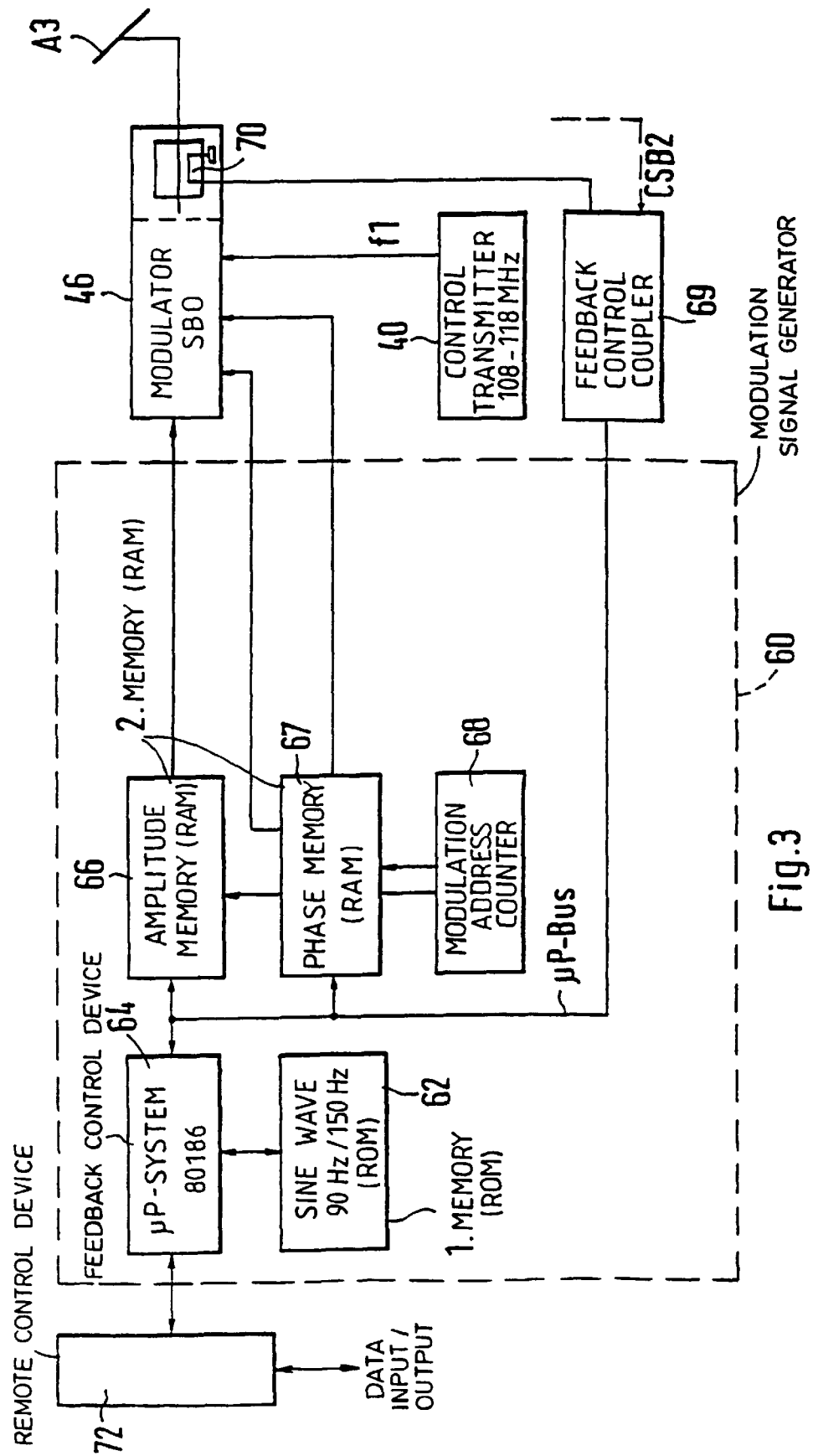
FIG. 3 shows an expanded block circuit diagram including the modulation signal generator and its connection to other devices.

As FIG. 3 shows, the modulation signal generator 60, in a first digital memory 62 (in the example a ROM), contains the values of a sine wave for a frequency of 90 Hz and one for a frequency of 150 Hz with sufficiently fine increments. For this purpose an increment of 1° was selected. From the two stored waves, any combinations of patterns or wave forms, which may be formed from a 90 Hz wave and a 150 Hz wave, can be digitally calculated by means of a computing device 64 contained in the modulation signal generator 60, and then digitally stored in a second memory 66, 67 (RAM) as amplitude and phase. The stored values of the pattern are outputted using a modulation address counter 68 and converted by a digital-analog converter and a smoothing device (also contained in the modulation signal generator 60) into an analog wave form, which is used for modulation in the modulators 45 to 47 (and in an arrangement according to FIG. 2 also for modulation in the modulator 48). For the sake of simplicity, FIG. 3 shows only the connection to the modulator 46, which feeds the antenna A3. The computing device 64 also serves for control and contains a microprocessor system.

A control coupler 69 feeds measuring signals, which represent the phase and amplitude of the antenna currents and in the example are obtained by directional coupler (70 for antenna A3), via a microprocessor bus to the computing device 64. An excessive deviation from the set-point values is followed by a feedback control.

A remote control unit 72 is connected to the modulation signal generator 60. The unit can be operated by means of a terminal and contains a data communications modem for connection to remote control devices.

In the arrangement in FIG. 2 (as in FIG. 1) the guide carrier oscillation f1 is fed via a separate output of the control transmitter, here denoted by the reference number 40', to each of the modulators 45, 46 and 47 for the generation of the control signal. In addition a further frequency f2, at an interval of 16 kHz from frequency f1 and in the example lower than f1, is emitted on an output C1 of the control transmitter 40' and fed to a modulator 48 for generation of the clearance signal. In addition to the arrangement shown in FIG. 1, a modulation input of the modulator 48 is connected by way of a modulation line 54 to an assigned output of the modulation signal generator, here denoted by the reference 60'.

A simple signal distribution circuit 75 is available for feeding in the clearance signal. As FIG. 2 shows, the signal distribution circuit 75, in contrast to the hitherto complicated load distribution circuits, has only three 3dB couplers 82 to 84, the 3dB couplers 82 and 84 acting as addition elements and the 3dB coupler 83 acting as power divider, the outputs of which each feed one of the other two 3dB couplers. The output signal of the modulator 45 is fed to the other input of the 3dB coupler 82 and its output feeds the antenna A1. The output signal of the modulator 46 is fed to the other input of the 3dB coupler 84 and its output feeds the antenna A3. The output signal of the modulator 47 is not led via one of the 3dB couplers but is fed directly to the antenna A2.

The percentage modulation for the individual modulators in the example is as follows:

Modulator 45 (generates CSB+SBO for antenna A1): 90 Hz with 46% and 150 Hz with 34%;

Modulator 46 (only generates SBO for antenna A3); Modulator 47 (generates CSB+SBO for antenna A2): 90 Hz with 64% and 150 Hz with 16%;

Modulator 48 (generates clearance): 90 Hz with 25% and 150 Hz with 55%;

It would be sufficient for digital calculation and subsequent analog generation of the patterns, for example, to manage with the stored digital values corresponding to a quarter wavelength of a sinusoidal oscillation of a single frequency. This would require more computation than the method described above, in which two complete waves of different frequency are digitally stored.

In the example, an amplitude modulation of the signals is used. The invention is, however, not limited to this. The invention can also be used for phase modulation, for example.

What is claimed is:

1. A glide path transmitter device for use in an instrument landing system having a plurality of antenna radiators, the transmitter device comprising:

a plurality of digitally controlled modulators, wherein the plurality of antenna radiators emit low-frequency modulated high-frequency signals, containing carrier and side-band components and superimposed in a Fraunhofer region to form a guide signal to be analyzed by aircraft, phases of carrier oscillations of the high-frequency signals emitted form the guide signal and are fixed in relation to each other, a respective digitally controlled modulator of the plurality of digitally controlled modulators is provided for each high-frequency signal of the high-frequency signals fed to a respective antenna radiator, and the respective digitally controlled modulator modulates a phase and amplitude of a high-frequency oscillation fed thereto according to a pre-determined pattern and feeds the modulated high-frequency signal into the respective antenna radiator.

2. The device according to claim 1, further comprising:

a modulation signal generator provided for generating the pattern fed to the respective modulator, wherein the modulation signal generator is configured to generate the pattern on a basis of at least one wave form digitally stored in a memory.

3. The device according to claim 2, further comprising:

a second memory, in which adjustment values are stored for the respective modulator, provided in the modulation signal generator.

4. The device according to claim 3, further comprising:

a feedback control device, wherein measuring signals which, with regard to amplitude and phase, are characteristic of the high frequency signals emitted, are fed to the feedback control device and compared with set-point values therein, and when the measuring signals deviate from the set-point values, a feedback control is performed in such a way that at least one pattern of a respective modulator is modified until a set-point value is achieved.

5. The device according to claim 3, further comprising:

a remote control device which controls the transmitter device so as to be adjusted and controlled remotely.

6. The device according to claim 3, further comprising:

coupling devices, wherein the transmitter device is configured to generate a clearance signal, and the coupling devices are provided in to couple the clearance signal to one or more of the plurality of antenna radiators.

7. The device according to claim 3, wherein the transmitter device is configured to generate a clearance signal, and the clearance signal is generated by one of the plurality of modulators and which is set to a predetermined pattern.

8. The device according to claim 2, further comprising:

a feedback control device, wherein measuring signals which, with regard to amplitude and phase, are characteristic of the high frequency signals emitted, are fed to the feedback control device and compared with set-point values therein, and when the measuring signals deviate from the set-point values, a feedback control is performed in such a way that at least one pattern of a respective modulator is modified until a set-point value is achieved.

9. The device according to claim 2, further comprising:

a remote control device which controls the transmitter device so as to be adjusted and controlled remotely.

10. The device according to claim 2, further comprising:

coupling devices, wherein the transmitter device is configured to generate a clearance signal, and the coupling devices are provided in to couple the clearance signal to one or more of the plurality of antenna radiators.

11. The device according to claim 2, wherein the transmitter device is configured to generate a clearance signal, and the clearance signal is generated by one of the plurality of modulators and which is set to a predetermined pattern.

12. The device according to claim 1, further comprising:

a feedback control device, wherein measuring signals which, with regard to amplitude and phase, are characteristic of the high frequency signals emitted, are fed to the feedback control device and compared with set-point values therein, and when the measuring signals deviate from the set-point values, a feedback control is performed in such a way that at least one pattern of a respective modulator is modified until a set-point value is achieved.

13. The device according to claim 12, further comprising:

a remote control device which controls the transmitter device so as to be adjusted and controlled remotely.

14. The device according to claim 12, further comprising:

coupling devices, wherein the transmitter device is configured to generate a clearance signal, and the coupling devices are provided in to couple the clearance signal to one or more of the plurality of antenna radiators.

15. The device according to claim 12, wherein the transmitter device is configured to generate a clearance signal, and the clearance signal is generated by one of the plurality of modulators and which is set to a predetermined pattern.

16. The device according to claim 1, further comprising:

a remote control device which controls the transmitter device so as to be adjusted and controlled remotely.

17. The device according to claim 16, further comprising:

coupling devices, wherein the transmitter device is configured to generate a clearance signal, and the coupling devices are provided in to couple the clearance signal to one or more of the plurality of antenna radiators.

18. The device according to claim 16, wherein the transmitter device is configured to generate a clearance signal, and the clearance signal is generated by one of the plurality of modulators and which is set to a predetermined pattern.

19. The device according to claim 1, further comprising:

coupling devices, wherein the transmitter device is configured to generate a clearance signal, and the coupling devices are provided in to couple the clearance signal to one or more of the plurality of antenna radiators.

20. The device according to claim 1, wherein the transmitter device is configured to generate a clearance signal, and the clearance signal is generated by one of the plurality of modulators and which is set to a predetermined pattern.

* * * * *